(12) United States Patent
Hattori et al.

(10) Patent No.: US 6,313,969 B1
(45) Date of Patent: *Nov. 6, 2001

(54) MAGNETIC DISK MEDIUM AND MAGNETIC RECORDING SYSTEM

(75) Inventors: Kazuhiro Hattori; Tsutomu Aoyama; Isamu Sato, all of Tokyo (JP)

(73) Assignee: TDK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,758

(22) Filed: Apr. 5, 1999

(30) Foreign Application Priority Data

Apr. 14, 1998 (JP) .................................................. 10-120079

(51) Int. Cl.$^7$ ........................................................ G11B 5/82
(52) U.S. Cl. .............................................................. 360/135
(58) Field of Search ................................... 360/135, 126, 360/121, 317, 318

(56) References Cited

U.S. PATENT DOCUMENTS

| | | |
|---|---|---|
| 4,351,010 | 9/1982 | Arai . |
| 4,746,580 | 5/1988 | Bishop et al. . |
| 4,802,050 | 1/1989 | Miyabayashi et al. . |
| 4,935,278 | 6/1990 | Krounbi et al. . |
| 5,698,286 | 12/1997 | Ikarashi et al. . |
| 5,766,718 * | 6/1998 | Matsuda et al. ...................... 360/135 |
| 5,768,075 * | 6/1998 | Bar-Gadda ............................ 360/135 |
| 5,774,313 * | 6/1998 | Tanaka et al. ........................ 360/135 |
| 5,831,801 * | 11/1998 | Shouji et al. ......................... 360/126 |
| 5,930,073 * | 7/1999 | Tanaka et al. ........................ 360/135 |
| 6,081,411 * | 6/2000 | Green et al. .......................... 360/135 |

FOREIGN PATENT DOCUMENTS

| | | | |
|---|---|---|---|
| 6-28650 * | 2/1994 | (JP) | ...................................... 360/135 |
| 9-167339 | 6/1997 | (JP) . | |
| 10-40541 | 2/1998 | (JP) . | |

OTHER PUBLICATIONS

IBM Technical Disclosure Bulletin (vol. 11, No. 3 Aug. 1968).*
IBM Technical Disclosure Bulletin (vol. 17, Apr. 1975).*
Stephen Y. Chou, Proceedings of the IEEE, vol. 85, No. 4, pp. 652–671, "Patterned Magnetic Nanostructures and Quantized Magnetic Disks", Apr. 1997.
R. M. H. New, et al., J. Vac. Sci. Technol. B, vol. 12, No. 6, pp. 3196–3201, "Submicron Patterning of Thin Cobalt Films for Magnetic Storage", Nov./Dec. 1994.
S. Y. Yamamoto, et al., IEEE Transactions on Magnetics, vol. 33, No. 5, pp. 3016–3018, "MR Head Response from Arrays of Lithographically Patterned Perpendicular Nickel Columns", Sep. 1997.
R. J. O'Barr, et al., J. Appl. Phys., vol. 81, No. 8, pp. 4730–4732, "Fabrication and Characterization of Nanoscale Arrays of Nickel Columns", Apr. 15, 1997.

* cited by examiner

*Primary Examiner*—Allen Cao
(74) *Attorney, Agent, or Firm*—Oblon, Spivak, McClelland, Maier & Neustadt, P.C.

(57) ABSTRACT

A magnetic disk medium of the invention comprises a disk form of substrate, a multiplicity of unit minuscule recording areas formed of a magnetic material on the substrate to magnetically record information thereon and located concentrically or spirally at an interval in a peripheral or radial direction, and a non-recording area provided on the substrate and formed of a non-magnetic material that is embedded between the unit minuscule recording areas. Each unit minuscule recording area is in a form having a major axis and a minor axis, wherein the direction of the major axis is aligned with the radial direction of the substrate.

5 Claims, 3 Drawing Sheets

MAGNETIC DISK MEDIUM AND MAGNETIC RECORDING SYSTEM

BACKGROUND OF THE INVENTION

The present invention relates generally to a magnetic disk medium and a magnetic recording system, and more specifically to a magnetic disk medium and a magnetic recording system, which have main applications in computer peripheral recording equipment.

With increases in the recording capacity of computers, the recording capacity of magnetic recording systems tend to become increasingly larger. For the purpose of linear recording density increases, an important consideration is how an array of recording domains in a magnetic recording layer of a magnetic disk medium, formed by a write magnetic field generated from a magnetic head, are made minuscule.

To make the recording domains minuscule, it is particularly important to narrow the spacing between the foremost end of the magnetic head nearest to the magnetic recording layer and the magnetic recording layer, and to reduce as much as possible fringing due to a magnetic field diverging spatially from the foremost end of the magnetic head.

For noise reductions in a magnetic disk medium comprising a magnetic recording layer, the crystals of thin films are made minuscule with Br reductions, and exchange interactions among crystal grains are reduced.

It has been proposed to accomplish a medium with reductions in the transition width of magnetization and fringing upon recording by suppressing medium noise by control of crystal grains and anisotropic energy of the medium, control of orientation capability, exchange couple reductions, and use of a magnetization stabilizing structure. It has also been proposed to accomplish a thin-film magnetic disk wherein a guard band member made up of a non-magnetic material is located between adjacent recording tracks with a view to reducing side fringing of recording domains (JP-A 997419).

For the achievement of high linear recording density, perpendicular recording having an easy axis of magnetization in the perpendicular direction of a recording layer, and transverse recording having an easy axis of magnetization in a track direction within a film plane are available. These recording processes are expected to achieve an ever-higher recording density because demagnetization due to a demagnetizing field is more reduced than that in conventional longitudinal recording. Another proposal is made of a magnetic disk medium using a patterned medium comprising a substrate, a non-magnetic film such as an organic film or an Si film provided on the substrate, and unit minuscule recording areas obtained by embedding a magnetic thin film in recesses physically formed in the surface of the non-magnetic film. Never until now are a magnetic head used on the magnetic disk medium and how to record information thereon proposed.

A magnetic disk medium using such a patterned medium as mentioned above, for instance, a medium shown at 100 in FIGS. 3 and 4, comprises a disk form of substrate 102, a multiplicity of unit minuscule recording areas 104 formed of a magnetic material on the substrate 102 to magnetically record information thereon and located concentrically or spirally at an interval in a peripheral or radial direction, and a non-recording area 106 formed of a non-magnetic material that is embedded between unit minuscule recording areas. In the medium shown in FIG. 3, each of the unit minuscule recording areas 104 is in a rectangular form having a major axis and a minor axis, with the major axis direction aligned with the peripheral direction of the substrate, and in the medium shown in FIG. 4, each of the unit minuscule recording areas 104 is in a substantially cuboidal form. In the magnetic disk medium having such unit minuscule recording areas, the unit minuscule recording areas are individually isolated by the non-magnetic material from one another, so that fringing between adjacent unit minuscule recording areas can be eliminated. In the structure shown in FIG. 3, however, the improvement in the transfer rate of data is not always satisfactory. For the structure shown in FIG. 4, on the other hand, some contrivance is needed because perpendicular magnetic recording is carried out with a recording magnetic pole; that is, it is required to provide a return path or soft magnetic under layer in the medium, thereby achieving recording magnetic field enhancement.

It is therefore an object of the invention to provide a magnetic disk medium and magnetic recording system, which use a patterned medium structure as mentioned above so that the high transfer rate of data can be achieved with no fringing problem.

SUMMARY OF THE INVENTION

The above object is achieved by the inventions defined below as (1) to (5).

(1) A magnetic disk medium comprising a disk form of substrate, a multiplicity of unit minuscule recording areas formed of a magnetic material on said substrate to magnetically record information thereon and located concentrically or spirally at an interval in a peripheral or radial direction, and a non-recording area provided on said substrate and formed of a non-magnetic material that is embedded between said unit minuscule recording areas, each of said unit minuscule recording areas being in a form having a major axis and a minor axis, wherein a direction of said major axis is aligned with a radial direction of said substrate.

(2) The magnetic disk medium according to (1), wherein each of said unit minuscule recording areas comprises a single domain structure with an easy axis of magnetization thereof aligned with the direction of said major axis.

(3) A magnetic recording system that is a magnetic disk system comprising a magnetic head for writing information on a magnetic disk medium as recited in (1) or (2) and/or reading information from said magnetic disk medium, wherein said magnetic head comprises an upper magnetic thin film and a lower magnetic thin film that form a magnetic circuit with a magnetic gap located therebetween and a conductive coil that intersects said magnetic circuit, with a direction of a magnetic gap line aligned with a peripheral direction of said magnetic disk medium.

(4) The magnetic recording system according to (3), wherein said magnetic head is a thin-film magnetic head in which thin films are formed and stacked one upon another in a widthwise direction of a magnetic pole so as to have a narrow magnetic pole width.

(5) The magnetic recording system according to (3) or (4), wherein a length of upper and lower magnetic poles formed by said upper magnetic thin film and said lower magnetic thin film in a radial direction of said medium is gradually diminished toward ends thereof that opposite to said medium.

ADVANTAGES OF THE INVENTION

According to the invention, fringing between adjacent unit minuscule recording areas is prevented by use of a patterned medium structure. In addition, each unit minuscule recording area is in a form having a major axis and a minor axis, wherein the direction of the major axis is aligned with the radial direction of the magnetic disk medium and the direction of the minor axis is aligned with the peripheral direction thereof, so that the magnetic disk medium can have an increased recording density in the peripheral direction. It is thus possible to achieve an ever-higher transfer rate of data.

By using a patterned medium having a single domain structure (with the easy axis of magnetization aligned with the major axis direction of each unit minuscule recording area, i.e., the radial direction of the medium) for the magnetic disk medium, it is possible to make the diameter of crystal grains therein larger than those in a medium having a continuous recording layer on one side of a disk (for instance, the medium disclosed in JP-A-9-97419), even when they have the same linear recording density. Thus, the deterioration of magnetization due to thermal fluctuation can be reduced or eliminated and the single domain structure can ensure to achieve an ever-higher switching rate of magnetization. In the above patterned medium structure, the higher the linear recording density, the more is the influence of the demagnetizing field from adjacent domains reduced, so that a stable domain structure can be achieved.

With the magnetic head used herein wherein the direction of the magnetic gap line is aligned with the peripheral direction of the magnetic disk medium, it is possible to record information in the major axis direction of the unit minuscule recording areas in the above patterned medium. By forming and stacking thin films one upon another in the widthwise direction of a magnetic pole, it is possible to fabricate a magnetic head having a narrow magnetic pole width, thereby achieving linear recording density improvements. In addition, the length, in the radial direction of the medium, of the upper and lower magnetic poles formed by the upper and lower magnetic thin films can be gradually diminished toward the ends, i.e., foremost ends thereof that oppose to the medium, thereby effectively reducing or eliminating crosstalk between signals on adjacent tracks.

BRIEF DESCRIPTION OF THE DRAWINGS

These and other features of the invention will be apparent with reference to the following description and drawings, in which.

BEST MODE FOR CARRYING OUT THE INVENTION

The present invention will now be explained more specifically with reference to the drawings.

Figure 1:
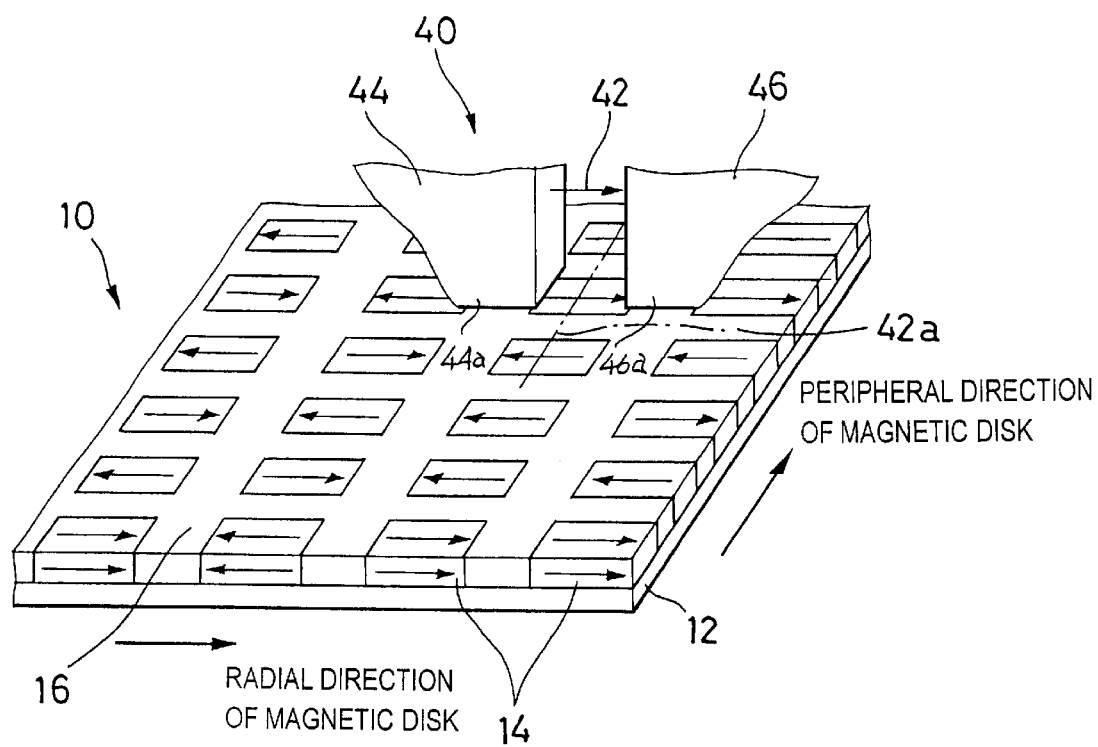
FIG. 1 is an enlarged perspective view of a general layout of one embodiment of the magnetic disk medium and magnetic disk system according to the invention.

FIG. 1 is a perspective view of a part of the preferred structure of the magnetic disk medium according to the invention.

As can be seen from FIG. 1, a magnetic disk medium generally shown at 10 comprises a disk form of substrate 12, a multiplicity of unit minuscule recording areas 14 formed of a magnetic material on the substrate 10 to magnetically record information thereon and located concentrically or spirally at an interval in a peripheral or radial direction, and a non-recording area 16 provided on the substrate 12 and formed of a non-magnetic material that is embedded between the unit minuscule recording areas 14. This structure allows the unit minuscule recording areas 14 to be placed in an almost completely magnetically isolated state, so that fringing between the above adjacent unit minuscule recording areas 14 can be avoided.

Each unit minuscule recording area 14 is in a form having a major axis and a minor axis. As depicted in FIG. 1 as an example, the area 14 is preferably of a nearly halved cuboidal or spheroidal shape, with the major axis direction thereof aligned with the radial direction of the magnetic disk and the minor axis direction thereof aligned with the peripheral direction of the magnetic disk. Such a unit minuscule recording area layout enables the linear recording density in the peripheral direction of the medium (in the track direction) to be improved with an improvement in the transfer rate of data.

Preferably, each unit minuscule recording area 14 has a single domain structure, which makes it possible to increase the diameter of crystal grains forming the unit minuscule recording area, thereby preventing a deterioration of magnetization due to thermal fluctuation. The single domain structure also ensures to achieve a high switching rate of magnetization. Thus, when the unit minuscule recording area is constructed with the single domain structure, the easy axis of magnetization is aligned with the major axis direction of the unit minuscule recording area. This is because the easy axis of magnetization is induced in the major axis direction by making use of the shape anisotropy of the unit minuscule recording area.

Each unit minuscule recording area 14 has a major axis length of about 0.02 to 0.2 $\mu$m, a minor axis length of about 0.01 to 0.1 $\mu$m and a thickness of about 5 to 50 nm, and is preferably formed of a magnetic material such as Co, Ni, Fe, or an alloy thereof. Preferable examples of the magnetic material are Co, Ni, Fe, CoCr, and NiFe.

The non-recording area 16 is provided all over the surface of the substrate 12 except the above unit minuscule recording areas 14, and has the same thickness as the unit minuscule recording areas 14. In other words, the magnetic disk medium 10 has a structure wherein the unit minuscule recording areas 14 are positioned in a given pattern of numerous recesses formed in a layer of the non-recording area 16 provided all over the surface of the substrate 12.

For the non-magnetic material that forms the non-recording area 16, oxides such as $SiO_2$, $Al_2O_3$ and $TiO_2$, nitrides such as $Si_3N_4$, AlN and TiN, carbides such as TiC, borides such as BN, and any polymer compound based on C, CH, and CF may be used.

In the magnetic disk medium of the invention, an orientation control film such as an NiP or Cr film may be provided as an under layer. If required, a protective layer or lubricating material may be provided.

How to fabricate the magnetic disk medium 10 having the above structure will now be explained with reference to FIG. 2.

Figure 2A:
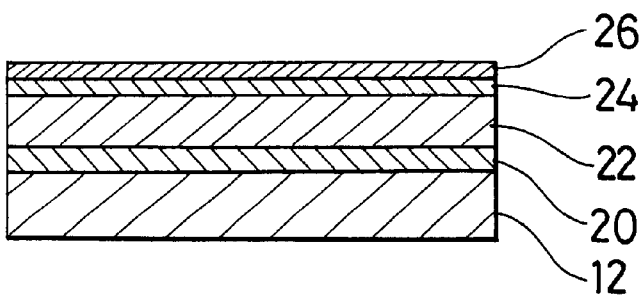
FIGS. 2A to 2F are sectional views of steps of fabricating the magnetic disk medium shown in FIG. 1.

As shown in FIG. 2A, a substrate 12 such as a silicon substrate is first provided thereon with a thin metal layer 20 formed of Au, Ti, Cr or the like, which serves as an under layer, an $SiO_2$ layer which serves finally as a non-recording area 16, a chromium layer 24 which serves as a mask for etching the non-recording area, and a PMMA (polymethyl methacrylate) layer 26 which serves as a photoresist.

Figure 2B:
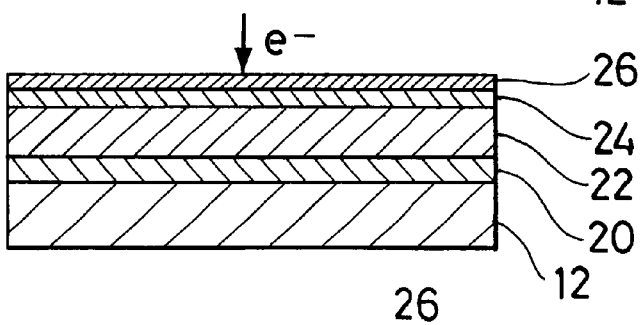

As shown in FIG. 2B, electron beam lithography is then used to expose the PMMA layer 26 to light in a dotted pattern, thereby forming a pattern of unit minuscule recording areas 14.

Figure 2C:
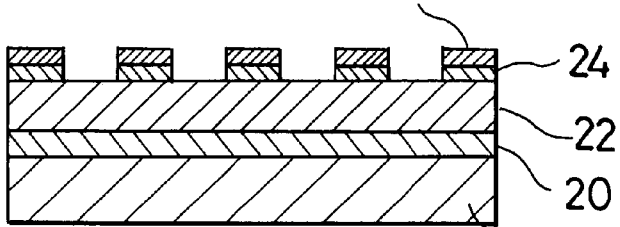

As shown in FIG. 2C, the chromium layer 24 exposed to light in a dotted pattern is wet etched. For the etching solution used in this case, it is preferable to rely on a mixed solvent consisting of isopropyl alcohol (IPA) and metaisobutyl ketone, etc.

Figure 2D:
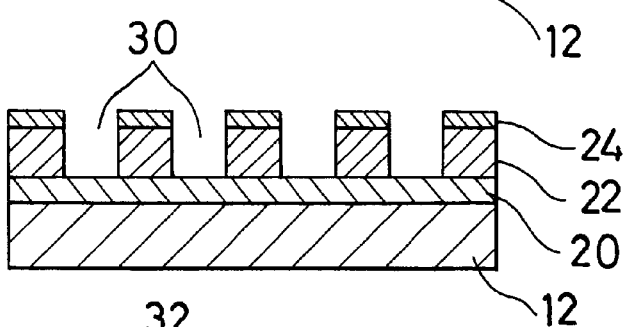
Figure 2E:
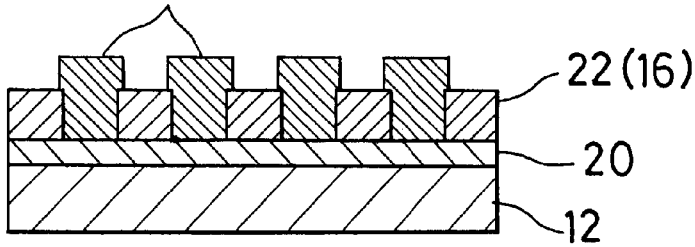

As shown in FIG. 2D, reactive ion etching is used to form recesses 30 in the $SiO_2$ layer 22 according to the above pattern of unit minuscule recording areas 14. In the recesses 30 formed, a metal plating layer 20 is exposed under them. As shown in FIG. 2E, electroplating is applied to the metal plating layer 20 to embed a magnetic material 32 such as Co in the recesses 30. At this time, the electroplating is carried out to such an extent that the recesses 30 are overflowing with the magnetic material 32.

Figure 2F:
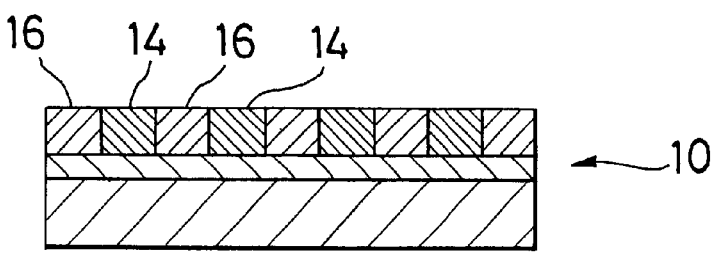
Figure 3:
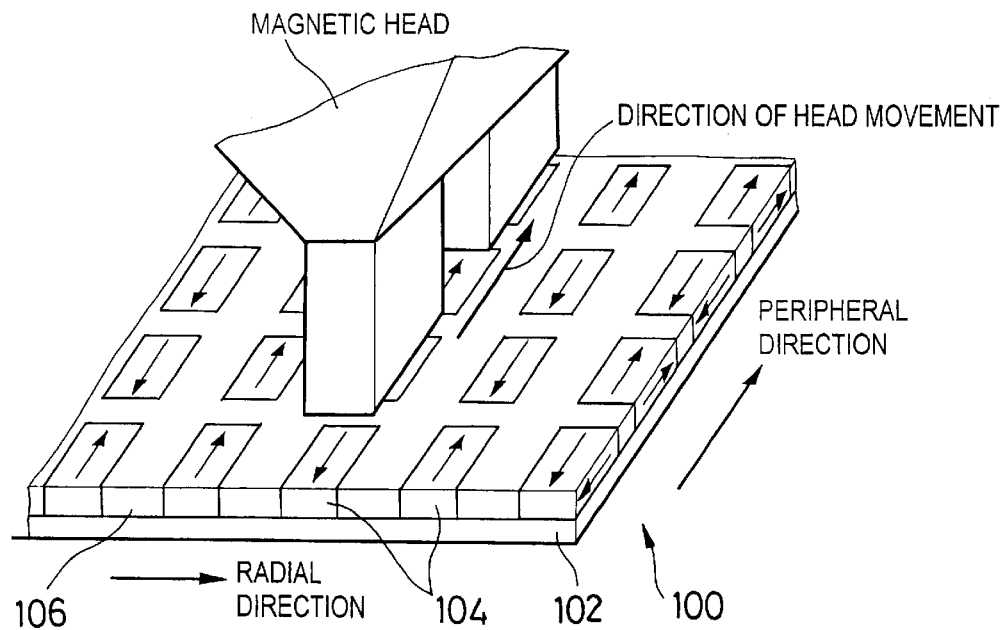
FIG. 3 is an enlarged perspective view of a part of a patterned medium comprising a magnetic head and unit minuscule recording areas, each having an easy axis of magnetization in the peripheral direction of longitudinal recording.
Figure 4:
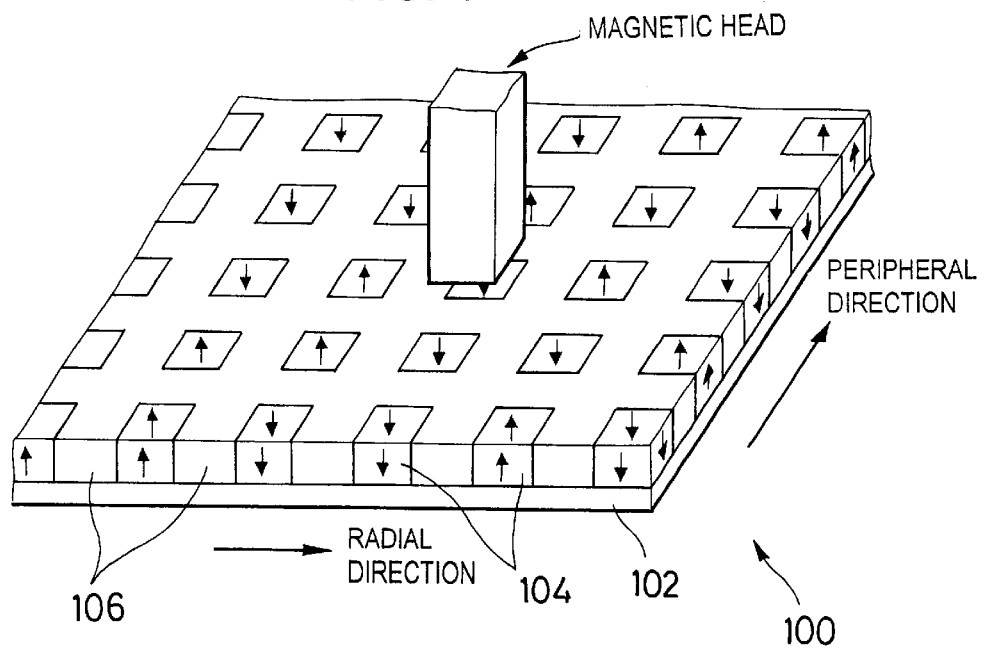
FIG. 4 is an enlarged perspective view of a part of a patterned medium comprising a magnetic head and unit minuscule recording areas for perpendicular magnetic recording.

Finally, the overflow of the magnetic material 32 is polished out by means of chemical mechanical polishing to form the unit minuscule recording areas 14 and make the overall surface of the medium extremely smooth, as shown in FIG. 2F. In this way, the magnetic disk medium 10 is finished up.

Preferably, the above chemical mechanical polishing, etc. should be carried out at a pH of 9 to 12 using $SiO_2$ having a particle size of 20 to 60 nm for instance.

A magnetic head 40 used on the magnetic disk system according to the invention comprises an upper thin film 44 and a lower magnetic thin film 46 that form a magnetic circuit with a magnetic gap 42 located between them, and a conductive coil (not shown) that intersects this magnetic circuit, as typically shown in FIG. 1, with the direction of a magnetic gap line 42a aligned with the peripheral direction of the magnetic disk medium.

The upper magnetic thin film 44 and lower magnetic thin film 46 are made up of FeN, NiFe, CoZr, etc. by means of sputtering, etc. Film formation should preferably is carried out in the widthwise direction of a magnetic pole to obtain a narrow magnetic pole width with a film thickness of about 0.01 to 0.1 μm. The magnetic gap 42 should preferably have a length approximately equal to the major axis length of each of the unit minuscule recording areas 14 on the magnetic disk medium 10, for instance, of about 0.02 to 0.2 μm.

Preferably in the magnetic head 40, the lengths of the upper and lower magnetic thin films 44 and 46, shown in FIG. 1, in the radial direction of the medium are gradually diminished toward the ends, i.e., foremost ends 44a and 46a thereof that oppose to the medium; that is, the upper and lower magnetic thin films are tapered off. This intensifies the convergence of the magnetic field generated from the magnetic head, and effectively reduces crosstalk between signals on adjacent tracks.

The magnetic head used herein may be the same as a conventional magnetic head with the exception of the above head arrangement.

EXAMPLE

An example of the invention is given below by way of illustration and not by way of limitation.

Upper and lower magnetic thin films 44 and 46 were formed by making thin films of NiFe by a sputtering process in the widthwise direction of a magnetic pole, thereby preparing a magnetic head 40 having such a structure as shown in FIG. 1. The magnetic pole width was 0.1 μm, and the length of a magnetic gap 42 was 0.2 μm.

A magnetic disk medium 10, prepared by the steps shown in FIG. 2, included a non-recording area 16 formed of a non-magnetic material and unit minuscule recording areas 14 obtained by embedding (pure) Co in recesses formed in the non-recording area 16 according to a given pattern. Each unit minuscule recording area 14, and the non-recording area 16 had a thickness of 20 nm. Each unit minuscule recording area 14 was in a rectangular (generally cuboidal) form having a major axis and a minor axis in the longitudinal direction of the magnetic disk medium 10, with the major axis direction aligned with the radial direction of the magnetic disk medium 10. The size of the unit minuscule recording area 14 was 0.2 μm for the major axis and 0.1 μm for the minor axis, and the total period of the unit minuscule recording area 14 and the non-recording area 16 was 0.36 μm (70 kTPI) in the radial direction of the medium (with a spacing of 0.16 μm between adjacent unit minuscule recording areas in the radial direction), and 0.18 μm (141 KBPI) in the peripheral direction of the medium (with a spacing of 0.08 μm between adjacent unit minuscule recording areas in the peripheral direction). This recording density corresponded to 10 $Gb/in^2$. Each unit minuscule recording area 14 on the magnetic disk medium had a coercive force (Hc) of 750 Oe and a single domain structure with the easy axis of magnetization aligned with the longitudinal direction of the magnetic disk medium.

As shown in FIG. 1, the magnetic gap line 42a of the magnetic head 40 was actually aligned with the peripheral direction of the magnetic disk medium 10. Using this magnetic head 40, information was recorded on each unit minuscule recording area 14 on the magnetic disk medium 10. The state of magnetization upon recording of the magnetic disk medium 10 after the information was recorded thereon was observed under a magnetic force microscope (MFM). Consequently, it was confirmed that the recorded signals (period) are placed in a considerably magnetized state.

The above example indicates that with the magnetic disk medium and magnetic disk system constructed according to the invention, magnetic recording can be carried out and the linear density for magnetic recording can be much higher than achieved in the prior art with no influence of fringing, etc.

Japanese Patent Application No. 120079/1998 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A magnetic disk medium comprising:

a disk-shaped substrate;

a multiplicity of unit minuscule recording areas including a magnetic material on said substrate to magnetically record information thereon and being located concentrically or spirally at an interval in a peripheral or radial direction; and a non-recording area provided on said substrate and including a non-magnetic material embedded between said unit minuscule recording areas, wherein each of said unit minuscule recording areas has a major axis and a minor axis, said major axis aligned with an easy axis of magnetization of the unit minuscule recording areas, and wherein a direction of said major axis is aligned with the radial direction of said substrate, said radial direction being defined in a direction of a line extending through a center to an outside edge of the disk-shaped substrate.

2. The magnetic disk medium according to claim 1, wherein each of said unit minuscule recording areas comprises a single domain structure with an easy axis of magnetization thereof aligned with the direction of said major axis.

3. A magnetic recording system comprising:

a magnetic head configured to read/write information on a magnetic disk medium;

said magnetic head including an upper magnetic thin film and a lower magnetic thin film that form a magnetic circuit with a magnetic gap located therebetween and a conductive coil that intersects said magnetic circuit, with a direction of the magnetic gap line aligned with a peripheral direction of said magnetic disk medium, wherein said magnetic disk medium includes:

a disk-shaped substrate;

a multiplicity of unit minuscule recording areas including a magnetic material on said substrate to magnetically record information thereon and being located concentrically or spirally at an interval in a peripheral or radial direction; and a non-recording area provided on said substrate and including nonmagnetic material embedded between said unit minuscule recording areas, each of said unit minuscule recording areas includes a major axis and a minor axis, in which a direction of said major axis is aligned with a radial direction of said substrate.

4. The magnetic recording system according to claim 3, wherein said magnetic head is a thin-film magnetic head having thin films formed and stacked one upon another in a widthwise direction of a magnetic pole so as to have a narrow magnetic pole width.

5. The magnetic recording system according to claim 3, wherein a length of upper and lower magnetic poles formed by said upper magnetic thin film and said lower magnetic thin film in a radial direction of said medium is gradually diminished toward ends thereof that opposite to said medium.

* * * * *